(Model.)

3 Sheets—Sheet 1.

J. H. DEAN.
CORD KNOTTER FOR GRAIN BINDERS.

No. 260,087.

Patented June 27, 1882.

Attest:
R. F. Barnes.
A. B. Smith

Inventor:
J. H. Dean
By his Atty (Model.)
J. H. DEAN.
CORD KNOTTER FOR GRAIN BINDERS.
No. 260,087. Patented June 27, 1882.
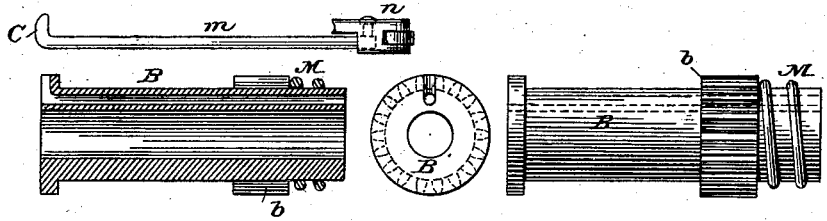
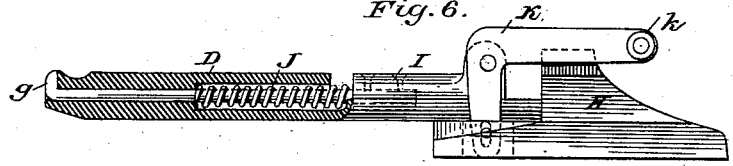
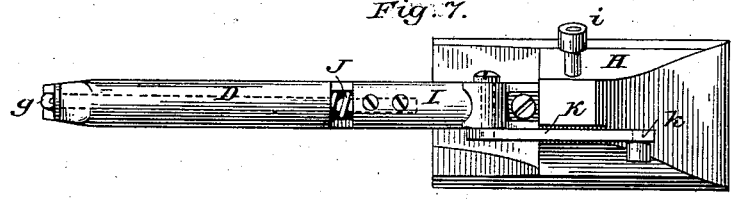
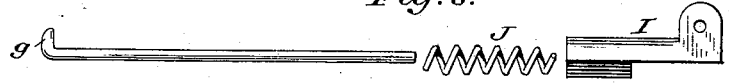
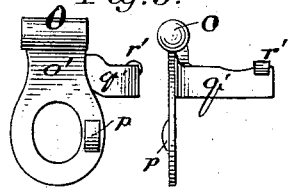
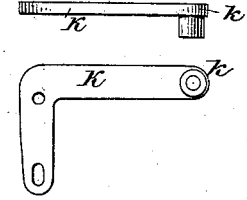
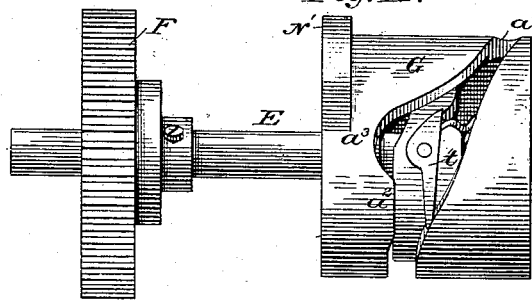
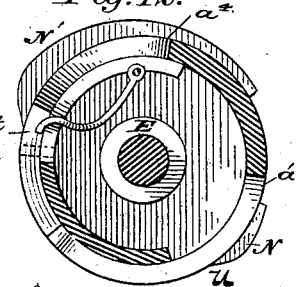
Attest:
R. F. Barnes
A. B. Smith
Inventor:
J. H. Dean (Model.)

3 Sheets—Sheet 3.

J. H. DEAN.
CORD KNOTTER FOR GRAIN BINDERS.

No. 260,087.

Patented June 27, 1882.

UNITED STATES PATENT OFFICE.

J. HENRY DEAN, OF KALAMAZOO, MICHIGAN, ASSIGNOR TO WHITELEY, FASSLER & KELLY, OF SPRINGFIELD, OHIO.

CORD-KNOTTER FOR GRAIN-BINDERS.

SPECIFICATION forming part of Letters Patent No. 260,087, dated June 27, 1882.

Application filed April 5, 1880. (Model.)

*To all whom it may concern:*

Be it known that I, J. HENRY DEAN, of Kalamazoo, in the county of Kalamazoo and State of Michigan, have invented a new and useful Apparatus for Knotting Cords Applicable to Grain-Binders, &c.; and I do hereby declare that the following is a full and complete description of the same, reference being had to the accompanying drawings, wherein—

Figure 1:
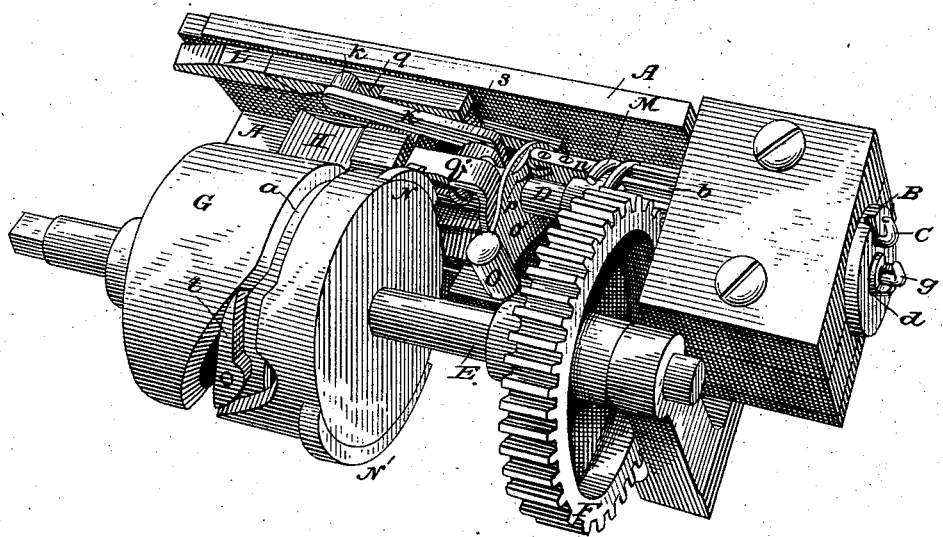
Figure 2:
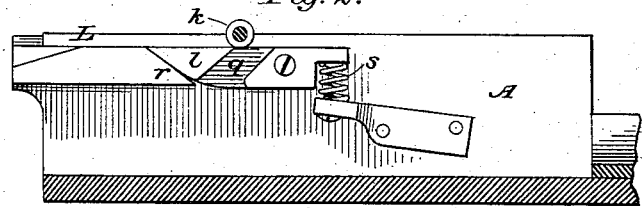
Figure 3:
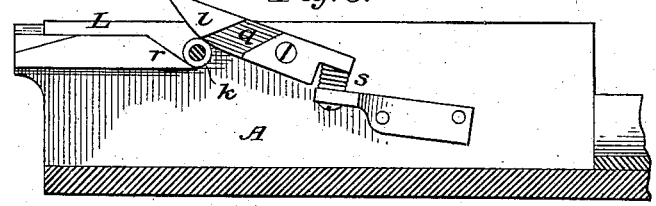
Figure 4:
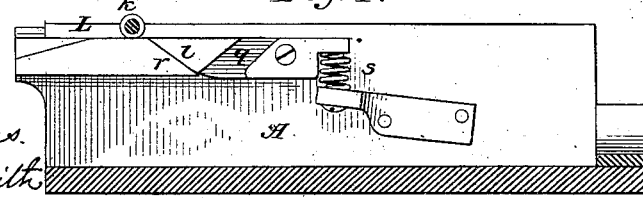
Figure 13:
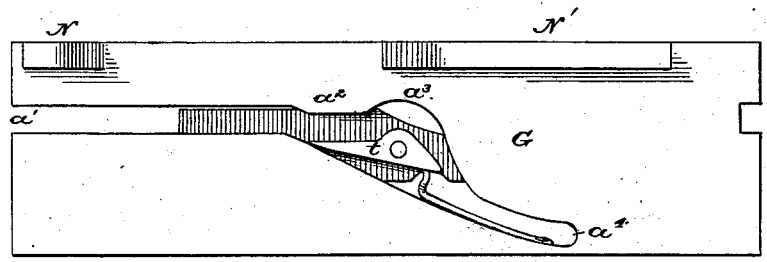
Figure 14:
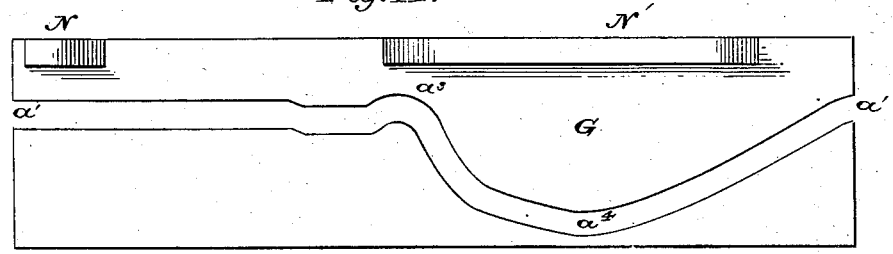

Figure 1 is a perspective view of my device in operative position, but detached from the mechanism whereby the material to be bound is gathered into a bundle and the binding material placed around it. Figs. 2, 3, and 4 show in various positions one of the guideway-switches. Figs. 5, 6, 7, 8, 9, 10, 11, and 12 represent in elevation and section the several operative devices. Fig. 13 is a development of the main operating-cams. Fig. 14 is a development of a modified form of the main operating-cams, whereby the rotary movement may be made continuous in one direction.

The devices whereby the knot is formed constitute the subject-matter of another application for Letters Patent filed of even date herewith, and are alluded to in this specification only for the purpose of illustration and to render clear the operation of the devices described and claimed herein, which consist, first, in a rotating cylinder with a reciprocating gripper carried thereon, a non-revolving reciprocating knotter and looping-hook, and an actuating wheel and cam on a shaft parallel with said cylinder; second, in the connecting and actuating devices whereby parts of the knotter are caused to move at the times determined; third, in the slide and cam guideway whereby the looper-hook is controlled and the cam whereby the slide is moved.

I have stated that my knot-tyer is applicable to grain-binders, and it is for such use that I contemplate using it chiefly; but it is also applicable to other purposes and capable of use with machines different from grain-binders in structure and mode of operation. For this reason the devices for collecting the material to be bound and for placing the band around the same are not shown. They are well understood and do not require description.

That others may fully understand my invention, I will particularly describe it.

A is the supporting-frame, which is attached in some proper manner to the supporting-frame of the machine which carries and presents the cord.

A rotating hollow cylinder, B, is placed in suitable bearings at the end of the frame A, and serves as a carrier for the gripper-hook C, by which the ends of the cord to be knotted together are seized, held, and carried around the knotter D, which reciprocates within said cylinder, but does not rotate with it. The gripper C and knotter D receive their several motions from a shaft, E, which has a rotation back and forth, and is driven in any proper manner synchronously with the mechanism which carries the cord. The shaft E carries a gear-wheel, F, which meshes with a pinion, $b$, on the cylinder B. The rotation of the cylinder B extends over about one and one-half revolution, and it is therefore necessary that the wheel F should be in length of pitch-line in excess of one and one-half time the pitch-line of the pinion $b$.

The knotter consists of a neck, $d$, around which the cord is wound, and a laterally-projecting flange, $e$, under which the cord is held while the end is being carried over it to the looping-hook or gripper $g$, the shaft of which extends axially through the knotter-shaft. The knotter D and the gripper-hook $g$ have reciprocations in the same direction, and their movements are partly coincident and partly independent. These movements are derived primarily and remotely from a rotating cylinder, G, which is provided with two sets of cams, and immediately by other devices brought into play at the proper time by the action of the cams on the cylinder G. These devices, however, may be greatly varied in structure and mode of operation, and I therefore regard them as of secondary importance, and do not design to be limited to the use of them. For convenience, however, in understanding the operation of the principal device—that is to say, the knotter—I will confine my description to the parts which actuate the knotter, as shown in the drawings.

The looper-shaft D is rigidly attached at its rear end to the slide H, which reciprocates in suitable guideways on the frame or bed-plate A, and said slide is actuated and caused to move back and forth by means of a stud, $i$, the end of which engages with the cam-groove $a$ in the surface of the cylinder G. The configuration of said cam is such that the stud $i$ and the shaft D are caused to advance and recede at the proper times to receive and cast off the loop and form the knot. The shaft of the looping-hook $g$ passes axially through the looper-shaft D, and its rear end is secured to a slide, I. One-half of the shaft D is cut away at the rear end to give place to the slide I. A spring, J, laid around the shaft of the looping-hook $g$, constantly tends to push the slide I backward and close said looping-hook upon its seat. This tendency is controlled by the bell-crank lever K, which is pivoted at its angle to the slide I and fulcrumed at one end in the slide H, so that when its free end $k$ is raised the slide I is pushed forward and the looping-hook opened from its seat.

The free end $k$ of the bell-crank K is controlled by a guideway, L, and latch $l$, over which it travels as the slide H moves back and forth, opening and closing the looping-hook at the proper times.

The holding or gripping hook C, by means of which the ends of the band are held while the knot is being formed, is actuated to close the hook upon the cord by a spring, M, which bears backward upon the end of the shaft of said hook. In the drawings, this shaft is represented by $m$, and it has a block, $n$, mounted upon its end to receive the thrust of said spring. Said hook is caused to open by a cam, N, upon the exterior surface of the cylinder G. This cam acts upon an arm, $q'$, of a rock-shaft, O, and the other arm, $o'$, on said rock-shaft engages with the end of the shaft $m$ when thrown forward by the cam N, and causes said shaft $m$ and hook C to slide forward.

The arm $o'$, which engages the shaft $m$, I prefer to make in the form of a flat hoop, so that the end of $m$ will be in constant engagement therewith, and thereby the spring M is caused to do double duty—that is to say, close the hook C upon its seat and maintain a constant engagement between the arm $q'$ and cam N. The block $n$, therefore, is provided with a friction-roller, and the arm $o'$ is provided with a cam, $p$. The end $k$ of the bell-crank K rides upon the top of the guideway L as the slide H moves forward, and the hook $g$ is thereby kept open to receive the cord; but when, at the extremity of its forward motion, the end $k$ drops into the notch $q$, it permits the hook $g$ to close, so that at the commencement of its backward movement the hook $g$ will be closed upon the loop of the cord. The latch $l$ will yield to the end $k$ as the latter passes backward, and the hook will remain closed until said end $k$ encounters the incline $r$, when it will again pass up to the level of the guide L, and the hook will open again. The spring $s$ causes the latch $l$ to close quickly. As before stated, these movements are all dependent upon the reciprocation of the slide H, which in turn is governed by the cam $a$. It is required to give to the knotting devices a somewhat irregular and intermittent motion, and the cam $a$ is correspondingly irregular, and is provided with a switch, $t$, whereby the backward motion is rendered more regular than the forward movement. When the parts are all in their initial positions the stud $i$ is at the end $a'$ of the cam-groove $a$, the arm $q'$ of the rock-shaft O is upon the cam N and the shaft M rests upon the cam $p$, the end $k$ of the bell-crank K is resting on top of the guideway L, and the hooks C and $g$ and the neck $d$ are protruded, as shown in Fig. 1. From $a'$ to $a^2$ the cam $a$ is in a plane parallel to the plane of rotation—that is to say, straight—so that the position of the slide H and of the neck $d$ and hook $g$ will not be changed during the first part of the rotation of the cam-cylinder G and cylinder B. The first movement, however, of the cylinder B carries the shaft $m$ off the cam $p$ and permits the hook C to close, and the movement between the points $a'$ $a^2$ of the cam $a$ takes place during about one and one-half revolution of the cylinder B. When the stud $i$ has reached the point $a^2$ it passes into the forward recess, $a^3$, and thereby impels the slide H forward a little way, just far enough to permit the end $k$ to drop into the notch $q$, causing the hook $g$ to close upon its seat, and at about the same moment the arm $q'$ of the rock-shaft O engages with the cam N at the point $u$, and the hook C is thrown forward to release the ends of the bands, which are now held securely by the looping-hook $g$. From the point $a^3$ the cam-track $a$ tends rapidly backward in a plane oblique to the plane of rotation to the point $a^4$, so that the shaft D, with the looping-hook $g$ and neck $d$, is caused to retract rapidly into the cylinder B. When the stud $i$ has reached the point $a^4$ the knot will have been completed, and a retrograde movement will commence to restore the parts to their initial positions, ready to recommence when the new band has been properly presented. On this retrograde motion the stud $i$ passes behind the switch $t$, and thereby avoids the recess $a^3$. It is evident, however, that this retrograde motion may be avoided, and it may be desirable to avoid it by making the number of cogs on the pinion $b$ some multiple of the number of cogs on the wheel F, so that the parts will all assume the proper relative position at the end of a definite number of revolutions of the cylinder B. The distance between $a'$ and $a^4$ must, however, correspond to the same movement of the cylinder B as now. It will then be necessary also to connect the ends $a'$ and $a^4$ of the cam $a$ by continuing the same between those points over the remainder of the cylinder G, as shown in the diagram Fig. 14. The switch $t$ will then be unnecessary.

If the continuous rotary movement is employed, as last-above described, then the knotter may be caused to come to rest at the initial position in readiness for the cord-carrier; or the parts may be geared so that the cord-carrier will deliver the cord at the proper moment.

The knotter may be brought to rest in the ordinary manner—i. e., by automatically unclutching, by segment-gears, &c., expedients familiar to mechanics. If continuous motion is kept up, the cam N will be so fashioned that the hook C will remain closed except at the proper moment of the proper revolution to receive the band ends and grasp them—that is to say, said hook will be opened only twice during one revolution of the cylinder G, once to receive the band and once to release it.

It will appear evident that the cam $a$ and gear F may be developed on a plane, and thus form a reciprocating rack and cam, which may be pushed back and forth and drive the knotting mechanism precisely as herein described.

Having now described the mechanical offices of the devices I will recapitulate by describing the operation of forming the knot.

The various successive movements of the knotter during the process of tying the knot are shown in my other case, heretofore mentioned. The band-cord is laid in the hook C, and is held by the outside holder and cutter. The cord extends from said holder to the eye of the cord-carrier, and thence back to the source of supply, and the sheaf or gavel to be bound is inclosed in the loop of the cord, between the holder and said eye. The first forward movement of the cylinder B causes the hook C to close upon both parts of the cord and firmly hold them, and at a proper moment thereafter the cutter is brought into action and the cord is severed. The outside holder at the same moment seizes the same end and holds it while the cord-carrier recedes and draws from the source of supply material for a new band. The cord being severed is entirely held by the hook C, and is laid across the neck $d$, behind the lip or flange $e$. The continued movement of the hook C carries the ends of the band beneath the parts of the cord which is around the bundle. The stud $i$ has now reached the point $a^2$ of the cam $a$ and encounters the small inward projection, which causes the slide H to recede and draw the knotter back into its cell, so as conceal the flange $e$. The ends of the band are therefore caused to swing across in front of said flange $e$ as the hook C advances, and the ends of the band are therefore laid directly into the jaw of the looping-hook $g$. Immediately succeeding this position the knotter is thrust forward by the passage of stud $i$ into the recess $a^3$, and, as before stated, the hook $g$ thereupon closes upon the band ends and the hook C is opened to release them. The movement of the hook $g$ in closing and the immediately succeeding rapid retreat of the knotter have the effect of shedding the loop off the neck $d$, while the ends are rapidly drawn backward, and the knot is thereby drawn tight, independent of the weight or expansion of the bundle. The retreat of the knotter is also through a sufficient distance to draw the ends through the loop, and thereby tie a hard single knot, much less likely to become loose or untied than a bow-knot. The holder C will at first draw the cord across the neck $d$, and to that extent it will tighten the band around the gavel. It will continue to so draw the cord over the neck until the frictional resistance on the neck becomes greater than the frictional resistance under the holding-hook C, and thereafter the surplus cord will be drawn backward under said hook, thus utilizing the portions of cord between said holder C and the cutter. The holder C hereby also becomes the measure of the band-tension, and its pressure is graduated so as never to exceed the strength of the band material.

Any suitable device for holding and cutting the band may be employed, and any proper cord-carrier may be used. These parts are not specifically described, because this invention relates only to the method of tying the knot which secures together the ends of the band.

The knotter D does not revolve, and the cord is therefore always presented in the same position. It is therefore possible to cut away the knotter on the back, and thereby permit the loop to be discharged with greater ease and certainty. The cord is held and controlled positively during every part of the operation of tying the knot, and there is therefore no possibility of failure by reason of slipping of the cord or failure to remain in proper position at any time.

The operative parts herein described may be at any desirable distance from the knotter, as is evident, because it would be simply a question of length of the cylinder B and shafts M and D. Thus the knotter may be in the plane of the middle of the sheaf, and the gearwheel F and the cam-cylinder G quite outside the machine at its end.

Having described my invention, what I claim as new is—

1. The rotating cylinder B, provided with a reciprocating gripper and holder, C, and a non-revolving reciprocating knotter, D, and gripping looper-hook $g$, said knotter and looper being inclosed within said cylinder, combined with a rotating wheel, F, and cam-wheel G, mounted upon a shaft parallel with said cylinder, and suitable connecting devices, substantially as set forth.

2. The cylinder G, provided with the cam-groove $a$ and cam N, combined with the slide H and rock-shaft O, provided with arms $o'$ and $q'$, whereby the knotter and holder are actuated.

3. The rock-shaft O, provided with the annular arm $o'$ and cam $p$, combined with the shaft $m$, having the block $n$ and the rotating cam N.

4. The knotter-shaft D, perforated axially to receive the shaft of the hook *g*, combined with the slide I, spring J, and bell-crank K, all mounted on the slide H, whereby the hook *g* reciprocates with said shaft D, but is independently opened and closed.

5. The knotter-shaft D, mounted upon the slide H, which is actuated by the cam *a*, the slide I, and the bell-crank lever K, combined with the guideway L, provided with the switch *l*, as and for the purpose set forth.

6. The hollow cylinder B, provided at its inner end with the pinion *b* and with a longitudinal guideway for the holder C, combined with the reciprocating shaft D, slide H, actuating-wheel F, cam G, slide I, bell-crank K, guide L, and switch *l*, substantially as set forth.

7. The holders C and *g*, each provided with a retracting-spring, and having a rod protruding from the rear end of the cylinder B, combined with suitable devices whereby said holders may be operated independently of the rotation of said cylinder.

J. HENRY DEAN.

Witnesses:
JAMES M. DAVIS,
R. F. JUDSON.